May 8, 1956 W. FRANTZ 2,744,502
PNEUMATIC CONTROL APPARATUS
Filed Aug. 16, 1952
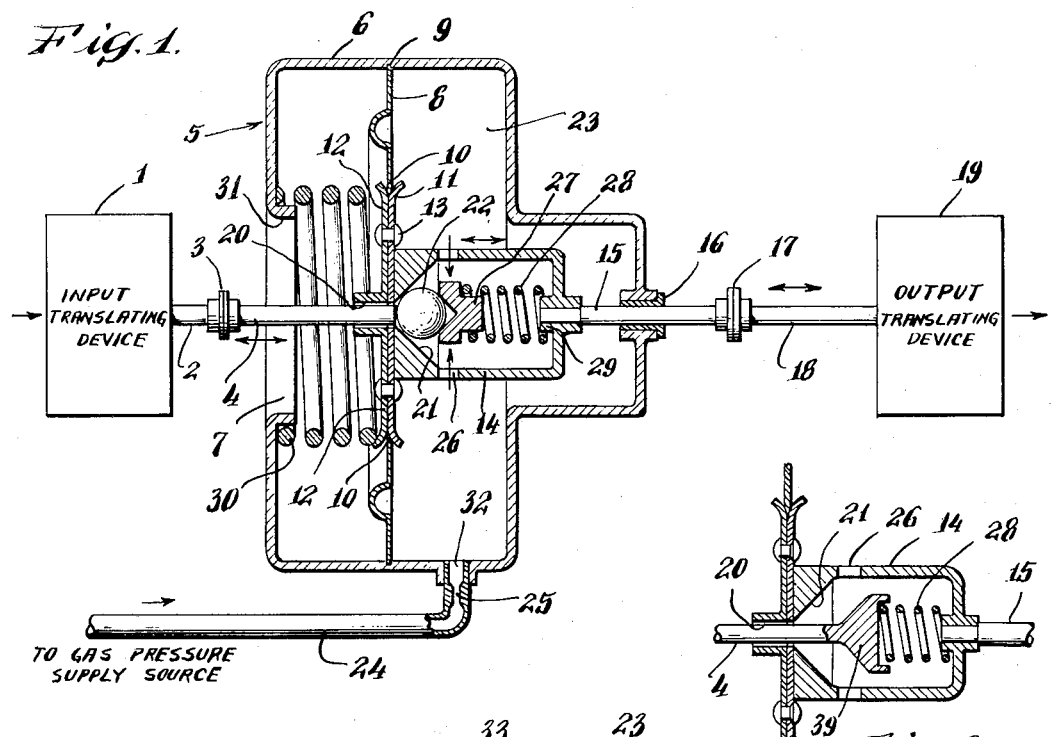
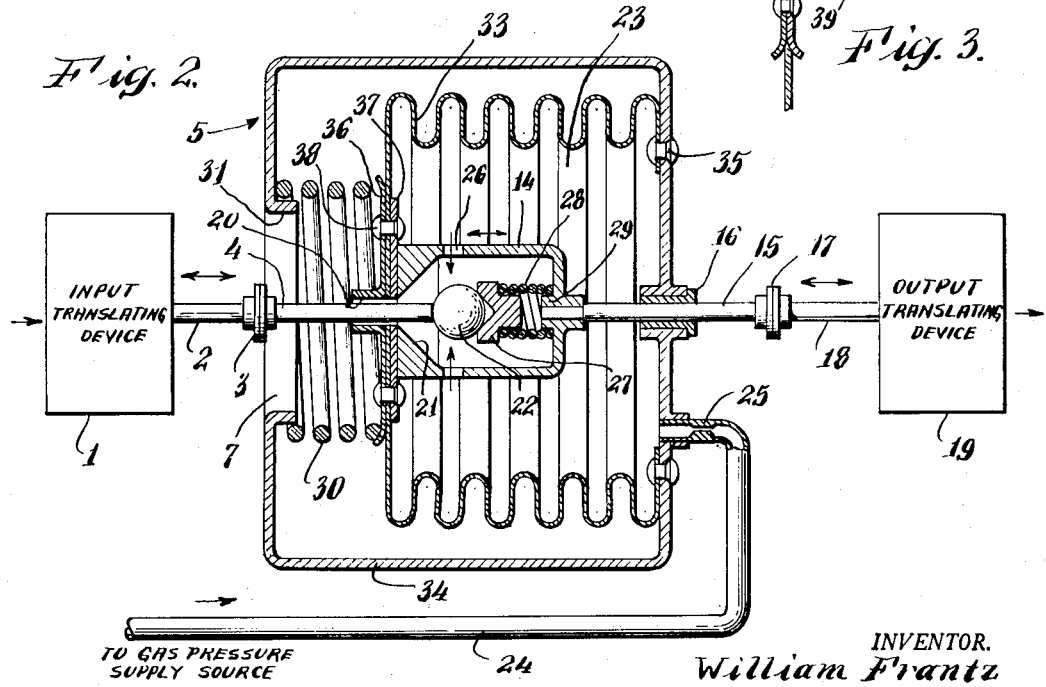
INVENTOR.
William Frantz
BY
Fraser, Myers & Manley
ATTORNEYS.

United States Patent Office 2,744,502
Patented May 8, 1956

2,744,502

PNEUMATIC CONTROL APPARATUS

William Frantz, Bronxville, N. Y., assignor to Simmonds Aerocessories, Inc., Tarrytown, N. Y., a corporation of New York Application August 16, 1952, Serial No. 304,690

6 Claims. (Cl. 121—41)

The present invention relates to apparatus for automatically controlling one quantity so that it maintains a predetermined relationship with another quantity throughout a range of variations assumed by the other quantity. More particularly, the present invention relates to servomechanism devices or so-called follow-up devices.

It is known to employ intermediate hydraulic, electrical or mechanical means in order to control one quantity such as speed, position, direction or temperature by another quantity of a similar or different nature. It is also known broadly to employ an intermediate pneumatic medium as the means for controlling one member by another member. In one such arrangement, there is provided a system including a pipe line containing air under pressure. At one end of the line there is provided an exhaust valve and at the other end there is a movable air-pressure-responsive member. The valve is actuated to increase or decrease the pressure applied through the line to the pressure-responsive member so as to move such member accordingly. However, in such a system and in similar known apparatus, the relative positions of the input and output members are determined solely by the air pressure transmitted between them. Accordingly, not only does such a system respond in a relatively slow manner, but also it suffers from the criticism that even small changes or fluctuations in the pressure of the air supplied to the line will introduce errors for which there is provided no adequate compensation. Thus, the desired relationship between the two members cannot hope to be achieved unless special auxiliary equipment is provided to regulate the pressure of the air supplied to the system. Moreover, known types of pneumatic arrangements are not always capable of maintaining the input and output members in proper relative position when, for example, the load on the output member suddenly increases. Furthermore, the magnitude of the forces available for correction is relatively small since the corrective force is limited by the magnitude of the changes in the air pressure transmitted to the output member.

It is an object of the present invention to provide apparatus with intermediate pneumatic means wherein an output quantity will follow in a more rapid manner than heretofore known the changes assumed by an input quantity.

It is a further object of the present invention to provide pneumatic control apparatus which is substantially self-regulating in that even appreciable fluctuations in the supply pressure of the gas fed to the apparatus will not destroy the desired relationship between the input and output quantities.

It is a further object of the present invention to provide a servomechanism or follow-up device with intermediate pneumatic means wherein such device is position-sensitive, rather than simply gas-pressure sensitive, in that the relative position of the output member is controlled at all times by the position of the input member whereby, for example, sudden or temporary changes in the load on the output member will not disrupt the proper relationship between the two members.

It is a further object of the present invention to provide pneumatic control apparatus which will make available to a controlled member large corrective forces without putting any appreciable load on the controlling member.

According to one aspect of the present invention, there is provided apparatus for automatically controlling an output quantity such as direction, position, temperature or speed so that it maintains a predetermined relationship with an input quantity over a range of increasing or decreasing variations assumed by the input quantity, the apparatus including a pneumatic follow-up device which is supplied with gas from a source of gas pressure and comprises movable gas-pressure-responsive means operatively associated with the output quantity and movable in response to changes in gas pressure inside the device, there being provided right in the pressure-response means itself an exhaust aperture for releasing gas from the device to an extent corresponding with the degree the aperture is open and for correspondingly regulating the gas pressure in the device, and aperture-closing means movable to open or close off the aperture in response to and to a degree corresponding with each respective variation assumed by the input quantity and to change correspondingly the gas pressure in the device.

According to the present invention, more specifically there is provided a device supplied with gas from a source of gas pressure for transmitting movement from a first member to a second member and for maintaining such members in predetermined relative positions for the various positions assumed by the first member, the device comprising movable gas-pressure-responsive means operatively coupled to the second member and having a portion biased on one side under a biasing force of predetermined fixed magnitude tending to move the pressure-responsive means in one direction and exposed to the gas pressure on the opposite side thereof under a gas pressure force tending to move the pressure-responsive means in the opposite direction and for a given position of the first member such gas pressure force normally neutralizing or balancing out the constant biasing force so as to maintain the pressure-responsive means in one of a plurality of possible equilibrium positions, and a gas-bleed or exhaust valve provided in said portion, such valve being adjustable in response to movement by the first member in a given direction so as to reduce the gas pressure in the device and to unbalance the two forces to move the pressure-responsive means in said one direction until it assumes a new equilibrium position where the two forces are again balanced, the valve being adjustable in response to movement of the first member in a direction opposite to said given direction so as to increase the gas pressure in the device and to again unbalance the two forces to move its pressure-responsive means in a direction opposite to said one direction until it assumes another new equilibrium position where the two forces are again balanced.

The foregoing and other objects and advantages will become apparent from the following description of two embodiments of the present invention given by way of example with reference to the accompanying drawings, wherein:

Fig. 1 shows diagrammatically one illustrative embodiment of pneumatic control apparatus according to the present invention wherein a diaphragm is utilized as the gas-pressure-responsive element;

Fig. 2 shows diagrammatically another illustrative embodiment wherein a bellows is utilized as the gas-pressure-responsive element; and Fig. 3 shows diagrammatically how a conical valve head may be used in place of the spherical valve head illustrated in Figs. 1 and 2.

Referring to Fig. 1, an input translating device 1 of any suitable known type is provided to translate an input quantity such as speed, temperature, direction or position into a corresponding lateral movement of output member 2. For example, device 1 may comprise a bimetallic member positioned in a zone so as to detect temperature changes occurring therein constituting the input quantity and to translate such temperature changes into corresponding lateral movement of output member 2. Member 2 is mechanically connected by means of coupling member 3 to valve stem 4. Valve stem 4 comprises the input member of a pneumatic servomechanism or follow-up device 5 provided in accordance with the present invention.

Device 5 has a rigid stationary housing 6 shown in section in Fig. 1. Housing 6 closes off the inside of the device from the atmosphere except for the opening therein at 7 which communicates with the atmosphere. Fixedly mounted along its outer circumferential edge 9 in the housing 6 is an annular diaphragm 8 having its inner edge 10 sandwiched in between the rigid disc-like members 11 and 12 which are suitably attached together, for example by rivets 13. The arrangement is such that when diaphragm 8 moves to the right or left, members 11 and 12 will move in the same direction with the diaphragm. Fixedly attached to member 11 is a frame member 14 having an arm 15 slidably passing through the gas-tight bearing 16 in housing 6. Arm 15 makes mechanical connection by means of coupling member 17 with input member 18 of the output translating device 19 which may be of any suitable known type of translating the movement of input member 18 into an output quantity. For example, if temperature is the output quantity device 19 may comprise an electric potentiometer the arm of which is movable in response to movement of input member 18 to control the amount of electric current flowing through an electric heating coil located in a particular zone the temperature of which is to be controlled.

Members 11 and 12 are provided with a central opening 20 for receiving valve stem 4 and serving as an exhaust aperture communicating with the atmosphere through opening 7, valve stem 4 having a smaller cross sectional area than opening 20. The valve can thus be said to float with respect to the members 11 and 12. Mounted on members 11 and 14 is valve seat 21 symmetrically disposed about exhaust aperture 20 so as to receive spherical valve head 22. When the latter seats itself upon seat 21, exhaust aperture 20 will be completely closed off, thereby isolating from the atmosphere the gas-filled chamber 23 defined by diaphragm 8, member 11, and the right-hand portion of housing 6. Gas under pressure is supplied to chamber 23 from a convenient source through line 24. A constricted orifice 25 is preferably provided in the line 24 for a reason hereinafter to be explained.

The main body portion of member 14 to which arm 15 is attached may be shaped, for example in the form of a cylinder, so as to be completely enclosed, in which case apertures 26 need be provided therein to permit the gas in chamber 23 to communicate with the interior of member 14 and with the valve parts 21 and 22. Although the spherical valve head 22 is not shown in Figs. 1 and 2 as being an integral part of the valve stem 4, nevertheless it may be made an integral part if so desired. As shown, valve head 22 is held in constant engagement with the end of valve stem 4 so as to follow the various positions assumed by the valve stem. This constant engagement is accomplished by providing a valve-head retaining member 27 which is continuously pressed against a substantial portion of the valve head 22 by means of the compression spring 28 mounted on a portion 29 of the member 14.

On the side of diaphragm 8 opposite from chamber 23 there is provided a compression spring 30. Spring 30 is mounted on portion 31 of housing 6 so as continuously to urge the diaphragm 8 in a right-hand direction with a force of constant magnitude opposing the variable total force exerted on the diaphragm in the left-hand direction by the gas-pressure in chamber 23. For any given lateral position of the valve stem 4 and its valve head 22, the gas pressure in chamber 23 will have adjusted itself in a manner hereinafter to be explained so as to exert a total force against the right-hand wall of the diaphragm which is equal and opposite to the force of spring 30 so that the diaphragm will have assumed one of a plurality of possible lateral equilibrium positions corresponding to the position of the valve stem 4 and its valve-head 22.

As shown in the drawings, device 5 is mounted horizontally. It will of course be understood that when reference is made in the specification to "lateral" movement of the various elements in a "right-hand" or "left-hand" direction such reference is intended solely as a convenient way of describing the operation of the device, since the device may alternatively be adapted for vertical mounting or for mounting at any angle with the horizontal.

The operation of the apparatus is as follows:

When the input quantity has varied to an extreme condition at one end of the range of possible variations, then input translation device 1 will have positioned member 2 so that it is in its extreme left-hand position. For example, if temperature is the input quantity, then when the temperature has, say, decreased to a minimum value, member 2 will have been positioned at its extreme left-hand position. Accordingly, as shown in Fig. 1 valve stem 4 will also have been positioned at its extreme left-hand position and valve-head 22 under the influence of spring 28 will have been seated or substantially seated upon valve seat 21. Since the exhaust aperture 20 will thus have been completely closed off or substantially so, there will have been either no bleed through such aperture or at least a bleed at a constant rate and thus the gas pressure in chamber 23 will have been allowed to build up and adjust itself to a constant level under a condition where the total force exerted by the gas pressure against the diaphragm was equal to the opposing force of constant magnitude continuously exerted by spring 30. Under such a condition, diaphragm 8 as shown in Fig. 1 will likewise have assumed an extreme left-hand position with the valve head 22 seated or substantially seated on valve seat 21. Such a position will be one of a plurality of possible equilibrium positions for the diaphragm corresponding to a plurality of positions of valve stem 4.

With the above condition as a starting point, assume now that the input quantity should vary to a given extent from its original extreme condition so that member 2 correspondingly moves to the right from its extreme left-hand position thereby assuming a first new position. Correspondingly, valve stem 4 will assume a first new position and in so doing will push valve-head 22 away from its seat 21 a corresponding amount so that the valve stem will also assume a first new position. The exhaust aperture 20 will thus be partially opened to permit a partial exhausting of chamber 23 to the atmosphere. The dimensions of the valve seat, the valve head, the exhaust aperture, the gas inlet aperture 32 and the constricted orifice 25 are so chosen that the rate of exhaust will temporarily be more rapid than the rate at which the gas pressure source can supply the chamber. Thus, instantaneously after the valve stem has moved the valve head to its first new position away from the valve seat, the gas pressure in chamber 23 will begin to decrease so that its total force exerted on the right-hand side of diaphragm 8 becomes less than the constant opposing force of spring 30. Thus, the original equilibrium condition of the diaphragm 8 will be upset and the diaphragm instantaneously will begin to move to the right, correspondingly moving members 11, 12, 14, 15 and 18 also to the right. However, as the diaphragm steadily moves to the right, the valve seat 21 also moves in the same direction toward the first new position of the valve head, the movement of the valve seat thus steadily decreasing the degree of opening of exhaust aperture 20 which had been temporarily produced when the valve head was initially moved to its first new position. Thus, as the diaphragm moves steadily to the right, less and less gas is exhausted from chamber 23 and with the steadily decreasing rate of exhaust the pressure in the chamber steadily increases correspondingly until the diaphragm has reached a position where the force exerted by the gas pressure on the diaphragm again equals the constant force of spring 30. At this first new equilibrium position of the diaphragm, the valve seat will have moved close enough to the valve head so that the total gas pressure force in chamber 23 will remain in equilibrium with the spring load of spring 30. This condition will last until the valve stem and head are again moved in response to a new variation in the input quantity. Preferably, constricted orifice 25 is provided as shown so as to insure that the gas supply source will not swamp or nullify the venting action of the valve head 22.

Assume now that the input quantity should vary to a given extent from the first new condition it had just previously assumed back toward the above described original extreme condition, so that the input translation device 1 will in turn move member 2 to the left from its first new position back to a second new position nearer to its extreme left-hand position. For example, if the input quantity is temperature and if the temperature had just previously increased from an original minimum value to an intermediate value to move member 2 to the right from its extreme left-hand position to its first new position, then let it be assumed now that the temperature decreases to a certain extent from such intermediate value back toward its minimum value thus to move member 2 back to the left to a second new position.

Correspondingly, valve stem 4 will now assume a second new position more to the left than previously. Valve head 22 similarly will move to the left under the influence of spring 28 so as also to assume a second new position which is temporarily nearer to valve seat 21 than previously. The exhaust aperture 20 will thus be open to a lesser degree, and hence instantaneously pressure will begin to build up in chamber 23 so that its total force exerted on the right-hand side of the diaphragm becomes greater than the constant opposing force of spring 30. Thus, the first new equilibrium condition previously attained will be upset and the diaphragm instantaneously will begin to move to the left, correspondingly also moving members 11, 12, 14, 15 and 18 to the left. However, as the diaphragm steadily moves to the left, the valve seat also moves in the same direction away from the second new position of the valve head, thus steadily increasing the degree of opening of exhaust aperture 20 which had been temporarily produced when the valve head was initially moved to its second new position. Thus, as the diaphragm moves steadily to the left, more and more gas is exhausted from the chamber 23 and thus the pressure in the chamber steadily decreases until the diaphragm has reached a position where the force exerted by the gas pressure on the diaphragm again equals the constant force of spring 30. At this second new equilibrium position of the diaphragm, the valve seat will have been positioned close enough to the valve head so that the total gas pressure force in chamber 23 will remain in equilibrium with the spring load of spring 30. This condition will last until the valve stem and head are again moved in response to a further variation in the input quantity.

It can thus be seen that an initial input movement of the valve stem to the right or to the left in response to corresponding variations in the input quantity results in a corresponding movement of the diaphragm respectively to the right or to the left which in turn causes the output arm 15 to move so as to follow such input movement of the valve stem; and, in turn, corresponding responsive movement of member 18 and operation of output translating device 19 causes the output quantity to vary correspondingly so that the desired relationship between input and output quantities will be maintained at all times.

The pneumatic control apparatus illustrated in Fig. 2 is substantially the same as the apparatus of Fig. 1 except that bellows 33 is employed in place of the diaphragm 8 of Fig. 1. Also in Fig. 2, the relative positions of the parts is shown at the very instant the valve head has been moved to a new position away from the seat and before the diaphragm has had time to follow such movement so as to assume a corresponding new equilibrium position. The rigid housing 34 of device 5 is modified slightly as shown in order to accommodate the bellows properly. The bellows may be suitably mounted on housing 34, for example by rivets 35 as shown. The movable end of the bellows may be sandwiched in between rigid members 36 and 37 suitably attached to each other, for example by rivets 38. Mounted on member 37 is the output member 14. Gas under pressure is supplied to chamber 23 through an opening 38' in the end wall of housing 34. The other reference characters in Fig. 2 refer to the same elements as the corresponding reference characters of Fig. 1.

Fig. 3 illustrates a slight modification of the devices of Figs. 1 and 2. Conical valve head 39 is employed in place of spherical valve head 22.

From the foregoing description, it can be seen that the pneumatic follow-up apparatus in accordance with the present invention enjoys several important advantages over prior art pneumatic control arrangements. In one application of the present invention, a 2-inch diaphragm was employed and it was found that the total motion required of the spherical valve head from seating position to the completely vented position was in the neighborhood of from only one to two thousandths of one inch.

From the foregoing description, it will be appreciated that the pneumatic follow-up device of the present invention is capable of functioning much more rapidly than known pneumatic control arrangements. In known control arrangements, movement of an input member acts to position a valve head with respect to an exhaust valve seat in a first air chamber so as to set the degree of opening of the valve seat until the input member is again moved. The output is usually located in a second air chamber with an air pressure line between the two chambers. But such positioning of the valve head not only sets the initial degree of opening but also the final degree of opening for any one given position of the input member and valve head, since the initial and final degrees of opening are the same. Thus, there will be no hastening of the exhaust process and no hastening of a pressure build-up for a given input to the valve head, and hence the air pressure change will be relatively slow and the output response will be correspondingly sluggish.

In contrast, the follow-up response of a pneumatic follow-up device according to the present invention will be considerably faster. This result is obtained by the provision of an exhaust aperture right in the gas-pressure-responsive structure itself whereby input movement of the valve head toward or away from such exhaust aperture will be initially too close or initially too far away respectively, so that during the transient period before the pressure-responsive member has reached its new equilibrium position corresponding to such input movement, either the desired pressure build-up is aided by a degree of opening which is less than it ultimately will be when the new equilibrium is reached or else the desired pressure decrease is aided by a degree of opening which is greater than it ultimately will be when the new equilibrium is reached.

Furthermore, in known pneumatic control apparatus, the air pressure supplied from an air source must remain substantially constant so as not to introduce errors in the output by altering the position of the air-pressure-responsive output element when there has been no change in position of the input member or valve stem. Pneumatic control apparatus according to the present invention is capable of itself regulating or smoothing-out substantial changes in gas pressure in the gas arriving from the supply source. In one application of the present invention, for a given input position of the valve stem and head, a variation in gas supply pressure from four pounds per square inch to forty pounds per square inch caused no appreciable error in the desired relative positions of the input and output members. Known pneumatic control apparatus could not tolerate such a wide variation in gas supply pressure and therefore would require auxiliary pressure regulators in the system if the gas supply source did not happen to be of the constant-pressure type.

As mentioned hereinbefore, in apparatus according to the present invention the maximum movement required of the valve head from its seat to that position where maximum bleed will be obtained can be as little as one thousandth of one inch and therefore any further displacement beyond one thousandth of one inch which the particular movement of input member 4 has given the valve head from its seat will have no effect upon the rate of bleed. The diaphragm carrying the valve seat in cooperation with the valve head is able by a very slight movement to adjust the rate of bleed from the chamber substantially to compensate for undesired inlet gas pressure changes.

Moreover, it is to be noted that apparatus according to the present invention is position-sensitive, rather than being simply gas pressure sensitive as in known apparatus. That is, the output position of output arm 15 and member 18 is at all times determined by the position of the input valve stem 4 and valve head 22, since the position of diaphragm 8 and its valve seat 21 is in effect also the position of the output arm 15 and it is the distance between the valve seat and the valve head which determines whether the diaphragm, and hence the output arm, has yet reached the proper equilibrium position corresponding to the particular position of the input valve stem 4. The fact that the apparatus is position-sensitive assures accurate output positioning even when, for example, the load on the output arm 15 or member 18 should suddenly or temporarily increase.

While preferred illustrative embodiments of the present invention have been shown and described, it is to be understood that various modifications in the details of construction and mode of operation may be resorted to without departing from the spirit of the invention within the definition of the appended claims.

What I claim is:

1. A follow-up device for automatically maintaining the position of a controlled member in a predetermined relationship with respect to the position of a controlling member; comprising a rigid housing; a rigid disc-like member disposed within said housing; flexible means joining said disc-like member to the walls of said housing for movement relative to one wall thereof and providing a pressure chamber in the space between said one wall and said disc-like member, said disc-like member moving outwardly with respect to said chamber in response to pressure therein; resilient biasing means in engagement with said disc-like member for urging it inwardly against the chamber pressure; means operatively coupling said disc-like member with said controlled member through said one wall of the housing; inlet means including a constricted orifice for supplying said chamber with a gaseous medium under pressure; an exhaust aperture in said disc-like member; a valve seat within said chamber mounted on said disc-like member in registration with said exhaust aperture; and valve means floating with respect to said disc-like member, said valve means including a valve stem of smaller cross sectional area than said exhaust aperture extending through said aperture into said chamber and supported by said controlling member, and a valve head for said valve seat movable relative to said valve seat in response to movement of said controlling member to alter the pressure in said chamber and unbalance the forces acting on said disc-like member to move said disc-like member until said valve seat and said valve head assume a new equilibrium position.

2. A follow-up device according to claim 1 wherein said flexible means comprises an annular diaphragm.

3. A follow-up device according to claim 1 wherein said flexible means comprises a bellows structure.

4. A follow-up device according to claim 1 wherein said valve stem and valve head are non-integral with said valve head being in the shape of a sphere.

5. A follow-up device according to claim 1 wherein said valve head is spherical.

6. A follow-up device according to claim 1 wherein said valve head is conical.

References Cited in the file of this patent

UNITED STATES PATENTS

| | | |
|---|---|---|
| 1,540,181 | Olson | June 2, 1925 |
| 2,138,148 | Ecker | Nov. 29, 1938 |
| 2,185,449 | Veenschoten | Jan. 2, 1940 |
| 2,225,321 | Schwendner | Dec. 17, 1940 |
| 2,372,273 | Hermanson | Mar. 27, 1945 |
| 2,374,154 | Moore | Apr. 17, 1945 |
| 2,375,204 | Baker | May 8, 1945 |
| 2,432,877 | Francis | Dec. 16, 1947 |
| 2,651,316 | Fageol | Sept. 8, 1953 |
| 2,670,716 | Worster | Mar. 2, 1954 |

FOREIGN PATENTS

| | | |
|---|---|---|
| 112,466 | Switzerland | Nov. 2, 1925 |
| 295,290 | Great Britain | Oct. 31, 1929 |
| 741,199 | Germany | Nov. 6, 1943 |